United States Patent
Lodhia et al.

(10) Patent No.: US 11,135,946 B2
(45) Date of Patent: Oct. 5, 2021

(54) EXTENSIVELY RECONFIGURABLE VEHICLE SEAT DESIGN

(71) Applicant: Autodesk, Inc., San Rafael, CA (US)

(72) Inventors: Bhupendra Lodhia, Stevenage (GB); Andriy Banadyha, Uxbridge (GB)

(73) Assignee: Autodesk, Inc., San Rafael, CA (US)

( * ) Notice: Subject to any disclaimer, the term of this patent is extended or adjusted under 35 U.S.C. 154(b) by 115 days.

(21) Appl. No.: 16/414,052

(22) Filed: May 16, 2019

(65) Prior Publication Data
US 2019/0351787 A1 Nov. 21, 2019

Related U.S. Application Data

(60) Provisional application No. 62/672,376, filed on May 16, 2018.

(51) Int. Cl.
*B60N 2/90* (2018.01)
*B60N 2/02* (2006.01)
*A47C 31/12* (2006.01)

(52) U.S. Cl.
CPC .......... *B60N 2/0244* (2013.01); *A47C 31/126* (2013.01); *B60N 2/0276* (2013.01); *B60N 2/914* (2018.02); *B60N 2002/026* (2013.01); *B60N 2002/0268* (2013.01)

(58) Field of Classification Search
CPC .... B60N 2/0244; B60N 2/914; B60N 2/0276; B60N 2002/026; B60N 2002/0268; A47C 31/126
See application file for complete search history.

(56) References Cited

U.S. PATENT DOCUMENTS

| | | | |
|---|---|---|---|
| 4,655,505 A * | 4/1987 | Kashiwamura | A47C 7/467 297/284.6 |
| 5,772,281 A | 6/1998 | Massara | |
| 5,882,075 A | 3/1999 | Partington et al. | |
| 6,273,810 B1 * | 8/2001 | Rhodes, Jr. | A47C 4/54 454/120 |
| 6,384,715 B1 * | 5/2002 | Potter | A47C 7/467 340/407.1 |
| 6,873,892 B2 * | 3/2005 | Katz | B60N 2/0244 701/49 |
| 6,912,748 B2 | 7/2005 | VanSickle | |
| 7,393,051 B2 | 7/2008 | Donaghey | |

(Continued)

*Primary Examiner* — Philip F Gabler
(74) *Attorney, Agent, or Firm* — Fish & Richardson P.C.

(57) ABSTRACT

An extensively reconfigurable seat design can include a vehicle seat system including: a vehicle seat defining a vehicle occupant accommodating space, the vehicle seat including a seat cushion portion including multiple individually adjustable bladders, where each of the multiple individually adjustable bladders has a connected valve that controls fluid communication with an internal space of the individually adjustable bladder to adjust a pressure level within the internal space of the individually adjustable bladder, and an associated sensor configured to detect the pressure level within the internal space of the individually adjustable bladder. A computer can actively sense and control the pressure levels within the bladders, using the sensors and valves, to provide customization, adaptive, ride-active and intelligent control over a reconfigurable cushion for a vehicle.

18 Claims, 8 Drawing Sheets

(56) References Cited

U.S. PATENT DOCUMENTS

| | | | |
|---|---|---|---|
| 8,162,398 B2 * | 4/2012 | Colja | A61H 9/0078 |
| | | | 297/284.4 |
| 8,958,955 B2 * | 2/2015 | Hotary | B60N 2/06 |
| | | | 701/49 |
| 9,771,003 B2 * | 9/2017 | Kolich | G01G 19/4142 |
| 2002/0060485 A1 | 5/2002 | Fischer et al. | |
| 2016/0362023 A1 * | 12/2016 | Dankbaar | B60N 2/976 |
| 2017/0158088 A1 * | 6/2017 | Pike | B60N 2/62 |
| 2018/0072199 A1 * | 3/2018 | Strumolo | B60N 2/0244 |

* cited by examiner

EXTENSIVELY RECONFIGURABLE VEHICLE SEAT DESIGN

CROSS-REFERENCE TO RELATED APPLICATIONS

This application claims the benefit under 35 U.S.C. § 119(e) of U.S. Patent Application No. 62/672,376, entitled "EXTENSIVELY RECONFIGURABLE VEHICLE SEAT DESIGN", filed May 16, 2018.

BACKGROUND

This specification relates to adjustable vehicle seats, such as for use in automobiles and airplanes.

Adjustable seats in vehicles, such as automobiles, typically include various moving parts and motors, where the seat can be adjusted for a particular vehicle occupant by operating the motors. Moreover, additional functionality is also often included in such seats, such as heating and massage components. Such adjustable seat designs can increase the cost of manufacturing the vehicle seat due to the cost of the various parts and motors, and due to the complexity of installing the various parts and motors. Further, such adjustable seats are often heavier than is desirable given the need for increased fuel efficiency and the impact that vehicle weight can have on fuel efficiency.

SUMMARY

This specification describes technologies relating to adjustable vehicle seats, such as for use in automobiles and airplanes, and in particular to an extensively reconfigurable seat design.

A vehicle seat system can use a pneumatic bladder system to change seat configuration, and the resulting seat can be fully customizable. The pressure levels within multiple air pockets/bladders can be individually adjusted to suit the profile of a particular vehicle occupant. This can provide more compliance in cushions for the vehicle as well as better and/or finer levels of adjustment for comfort. In some implementations, ten or more, twenty or more, thirty or more, or even forty or more individually adjustable air bladders can be provided in a single seat cushion piece, providing a wide range of customizable cushion settings for the seat (e.g., a right buttock support may have a lower pressure level than a pressure level in a left buttock support in view of the vehicle occupant having a thick wallet in his right back pocket).

The system can be fed by a central pneumatic supply, and the pressure level in each bladder can be controlled using individual valves. The multiple bladders can be ergonomically arranged to support the vehicle occupant and also provide lateral support to each other. Thus, a seat can provide a fine level of control over its cushioning and exhibit no bottoming out effect. This can be achieved while also reducing the cost and weight of the seat as compared to traditional adjustable seats. In some cases, the seat cushion is additively manufactured, e.g., to further reduce costs.

Moreover, the fine level of control over the pressure levels in the air bladders/chambers can be actively controlled (e.g., in real time) during operation of the vehicle. This can provide pressure changes/adjustments in accordance with vehicle maneuvers, and potentially assist in avoiding injury during accidents in which the vehicle is involved. In some implementations, the seat's pressure configurations can be automatically adjusted based on a number of factors, and machine learning algorithms can be used to adjust the seat cushioning based on one or more of the following factors: driving location (e.g., from global satellite positioning system data or from cell phone network system positioning data), road condition (roughness/bumps), road contours (lateral and/or vertical bends/curves), driving style of a particular driver (e.g., sport versus comfort driving mode), information gathered from other sources (e.g., traffic alerts, Google® Earth data, Waze® data, etc.), and user specific customization.

In addition, some implementations can incorporate free air channels to provide ventilation. Air flow in these channels, e.g., in the spaces between the pressurized pockets/bladders/chambers, can make the seat "breathable". The flow of free air can be independently controlled and also directed upward through the seat, providing a "no sweat" surface. The amount of free flow air can be controlled based on the desires and/or needs of a specific seat occupant. In some implementations, an additional space/gap is provided between the tops of the pressurized pockets/bladders/chambers and the sitting surface of the seat. This space/gap can also include additional structures that facilitate both the cushioning effect of the seat and distribution of the free flow air to ventilation holes in the sitting surface.

BRIEF DESCRIPTION OF THE DRAWINGS

Like reference numbers and designations in the various drawings indicate like elements.

DETAILED DESCRIPTION

Figure 1A:
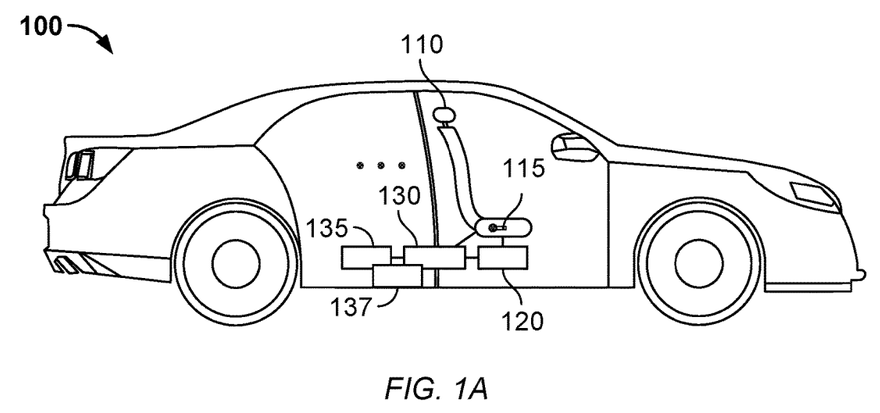
FIG. 1A shows a vehicle with an extensively reconfigurable cushion system for one or more seats within the vehicle.

FIG. 1A shows a vehicle 100 with an extensively reconfigurable cushion system for one or more seats 110 within the vehicle. The vehicle seat(s) 110 define vehicle occupant accommodating space, e.g., for the driver and passengers, and each seat 110 includes at least one seat cushion portion 115. As shown in this example, the seat cushion portion 115 is located on the bottom of the seat 110, but the systems and techniques described herein are readily usable in other parts of each seat 110, such as in the sides of the seat bottom, the back & lumbar portion of the seat, the side body portions of the seat, and the head rest.

Figure 1B:
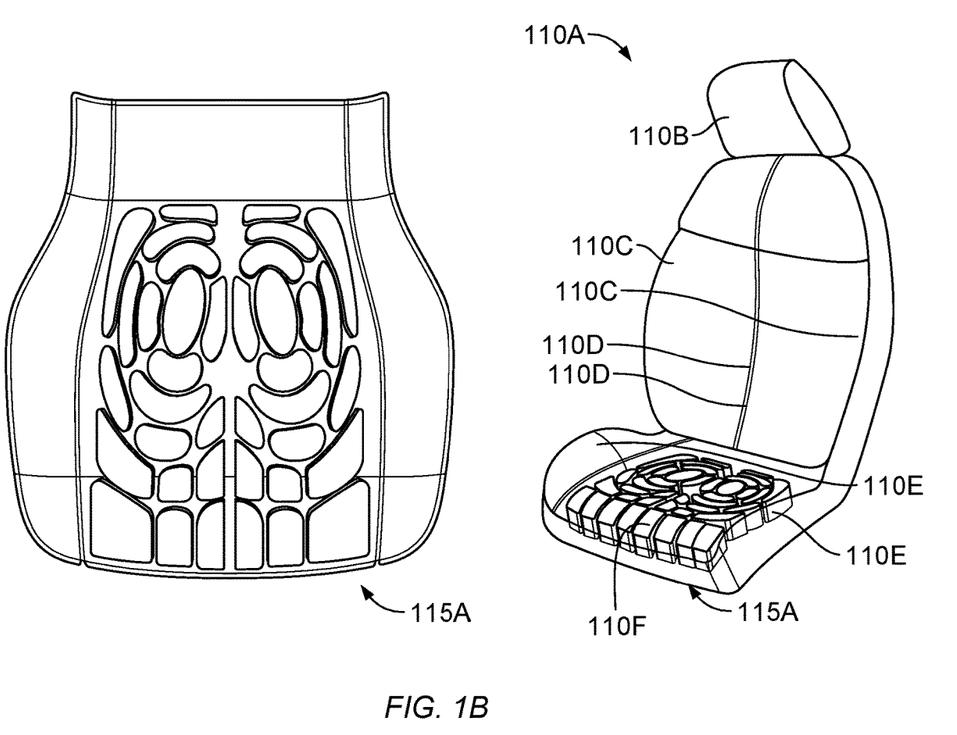
FIGS. 1B and 1C show a detailed example of a design for individually adjustable bladders within the seat cushion portion of a vehicle seat.
Figure 1C:
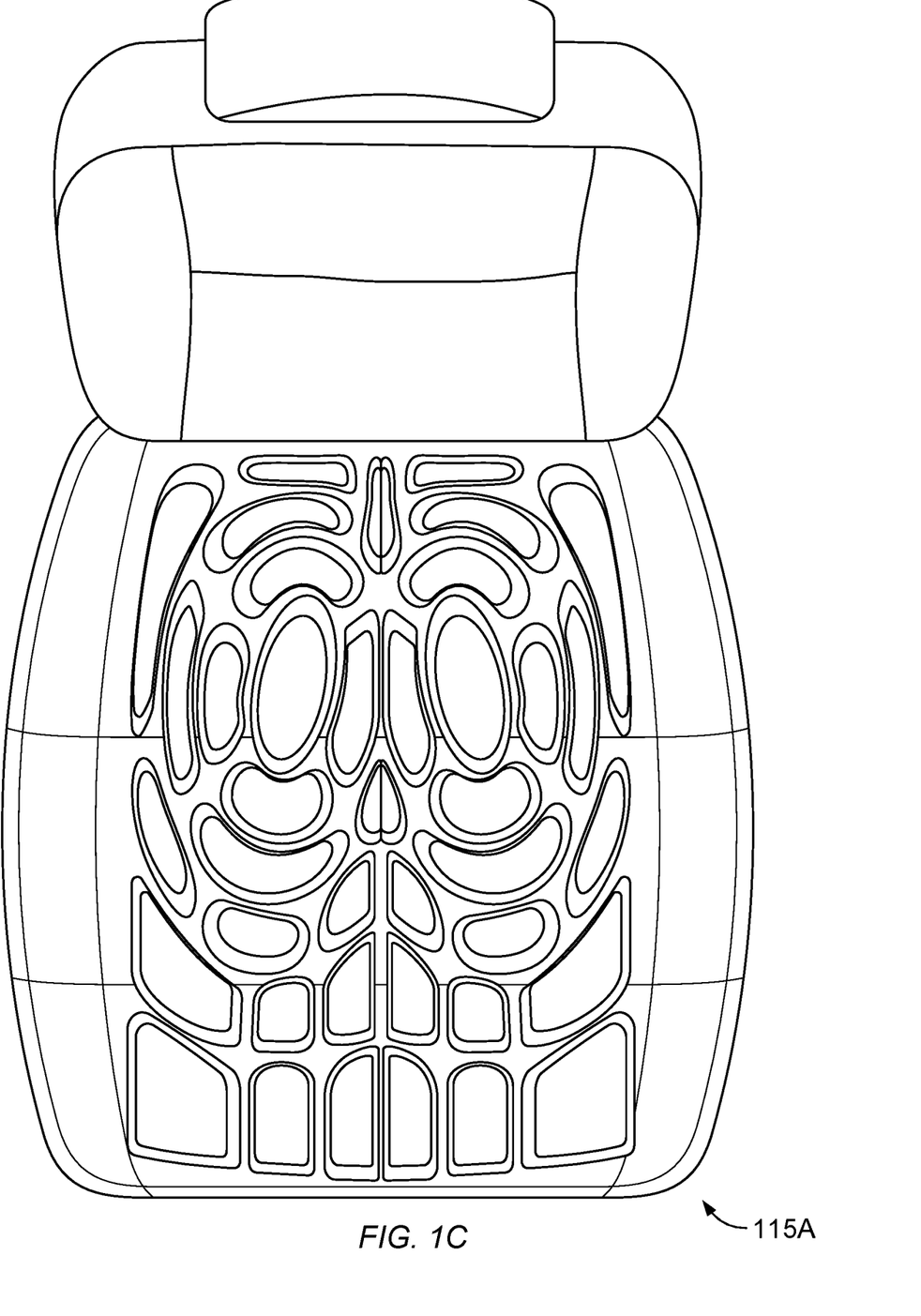

In any case, each such seat cushion portion 115 includes multiple individually adjustable bladders. FIG. 1B shows a detailed example of a seat 110A, which corresponds to seat 110 and includes individually adjustable bladders 115A. In the example shown, there are forty individually adjustable bladders 115A. FIG. 1C shows an enlarged view of the forty individually adjustable bladders 115A.

The individually adjustable bladders 115, 115A each include (1) a connected valve that controls fluid communication with an internal space of the individually adjustable bladder to adjust a pressure level within the internal space of the individually adjustable bladder, and (2) an associated sensor configured to detect the pressure level within the internal space of the individually adjustable bladder. The valves and sensor of each seat 110, 110A are coupled with one or more computers 120 and one or more supply reservoirs 130 to provide gas (e.g., air) to the individually adjustable bladders. In some implementations, the one or more supply reservoirs 130 are a single supply reservoir for each respective seat. In some implementations, the supply reservoir 130 can be a single, central supply reservoir used for all the seat cushions within the vehicle 100.

In addition, the supply reservoir(s) 130 can be filled with compressed air by an electrically controlled air compressor 135. Moreover, heating and cooling of the seat 110 can be provided via the air supply. For example a heat exchanger 137 (e.g., a heat pump) can be used to pre-heat or pre-cool the air that will be feed into the individually adjustable bladders 115, 115A. Further, as noted above, one or more portions of the seat 110, 110A, including head rest 110B, side body portions 110C, back & lumbar portion(s) 110D, seat sides 110E, and seat bottom and thigh portion(s) 110F, can each have separate groups of individually adjustable bladders, where each group of bladders can have a dedicated supply reservoir 130 or share a supply reservoir 130 with another group (in the same seat or for another seat), have a dedicated heat exchanger 137 or share a heat exchanger 137 with another group (in the same seat or for another seat), or a combination thereof.

The computer 120 is programmed to individually adjust pressure levels within the multiple individually adjustable bladders using the valves and based on data received from the sensors. For example, the data from the sensors provide the pressure level within each bladder, and the valve for each bladder can be controlled to either let air out of the bladder (to decrease the pressure) or to add air to the bladder from the reservoir 130 (to increase the pressure). The individual adjustments can be made in zones to ensure an even distribution of pressure, based on user preference and pressure normalization, and various other criteria and data can be used to adjust the pressure levels within the seat cushions, thereby creating an intelligent seat system (ISS) cushion design.

The ISS cushion design can provide full compliance cushions and full adjustment for comfort, which can maximize comfort for many different vehicle occupants. The extent of inflation can be based on the firmness or softness desired by each respective user. The computer 120 can also be coupled with the heat exchanger(s) 137 and be programed to heat or cool the air for the seat, as desired by each respective user. The computer 120 can be programmed to provide fully customizable settings, including various preset cushion (and temperature) settings configurations for various different vehicle occupants. Thus, the extent of inflation or deflation of each respective bladder is controllable to achieve specific air pressure targets, where the air pressure targets can vary across the different zones of the seat cushion.

Further, the data used by the computer 120 can include vehicle operation data, and the computer 120 can be programmed to create a ride-active system, where the seat cushioning responds to driving conditions. Moreover, all of this can be achieved using a very light seat cushioning system, with minimally complex sub-systems since both pressurized air and heating or cooling of the seat can be provided to the cushion by opening a valve to an air reservoir 130 with pre-heated or pre-cooled, pressurized air. Finally, the seat cushion itself can be built using additive manufacturing techniques, which substantially decreases the costs of production.

Figure 2:
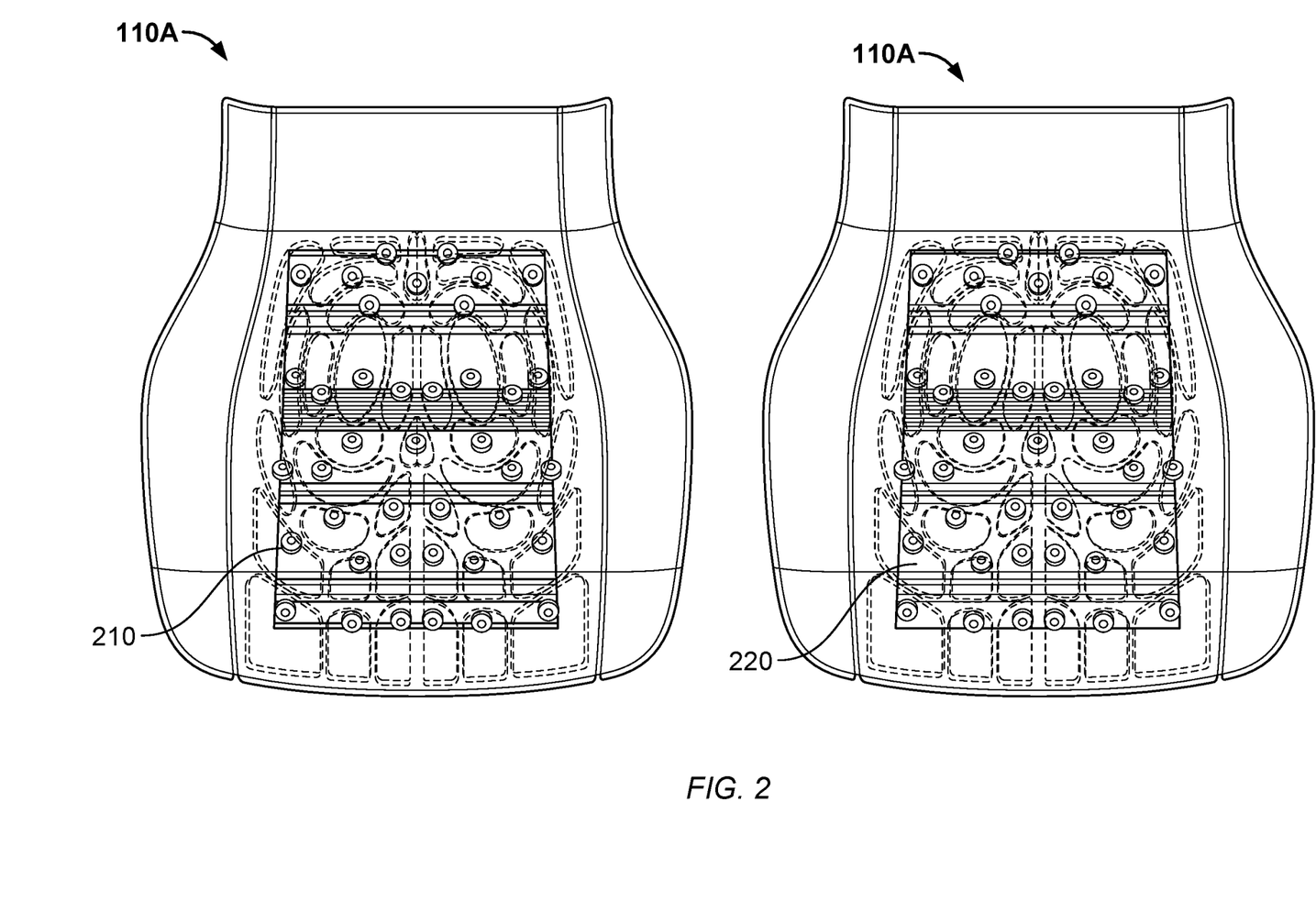
FIG. 2 shows an example of valves, sensors, and an air supply reservoir, as can be used with the individually adjustable bladders of FIGS. 1B and 1C.

FIG. 2 shows an example of valves, sensors, and an air supply reservoir, as can be used with the individually adjustable bladders of FIGS. 1B and 1C. As shown in FIG. 2, each bladder has an associated valve and integrated sensor 210. Each valve and integrated sensor 210 is further coupled with a shared air supply 220. In some implementations, each air valve is an electronic solenoid type valve, which is integrated into a manifold that feeds the individual air supplies to the bladders. The valves (e.g., solenoid valves) can be controlled by a computer (e.g., a central processing unit) with a feedback loop.

Figure 3:
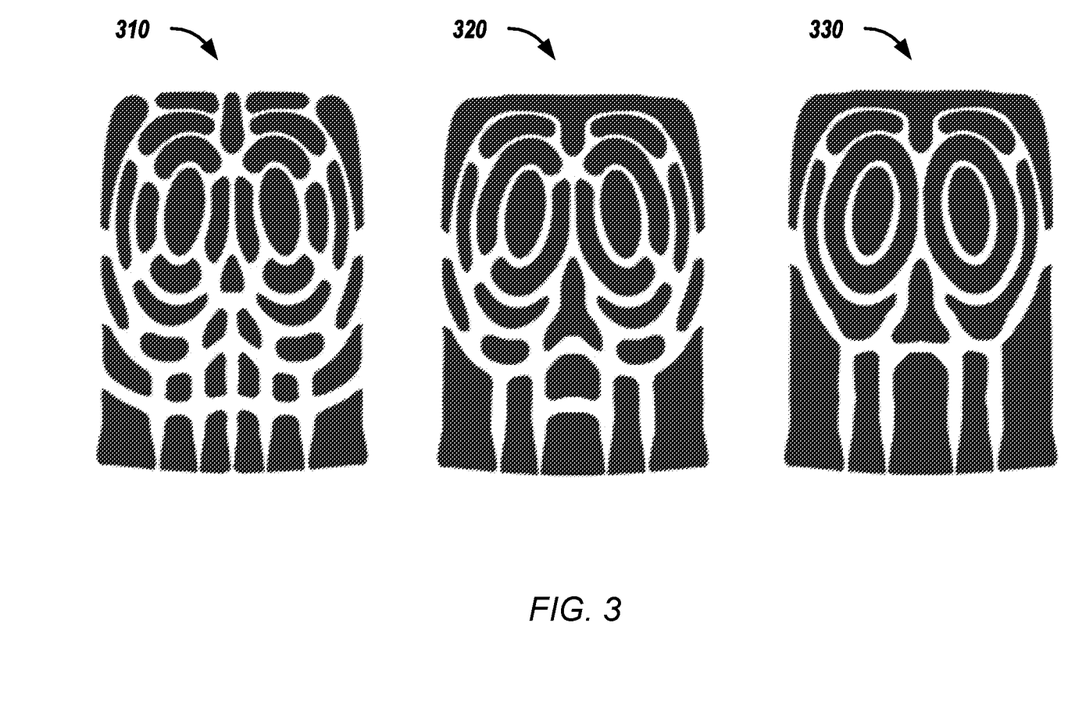
FIG. 3 shows additional design examples for individually adjustable bladders within the seat cushion portion of a vehicle seat.

FIG. 3 shows additional design examples for individually adjustable bladders within the seat cushion portion of a vehicle seat. A first seat bladder layout 310 corresponds to the individually adjustable bladders of FIGS. 1B and 1C. Thus, the seat bladder layout 310 has forty air pockets/chambers that can be individually pressurized to a desired pressure level. The seat bladder layout 310 includes a first set of at least eight individually adjustable bladders ergonomically arranged to support a left buttock of the vehicle occupant, a second set of at least eight individually adjustable bladders ergonomically arranged to support a right buttock of the vehicle occupant, a third set of at least six individually adjustable bladders ergonomically arranged to support a left thigh of the vehicle occupant, and a fourth set of at least six individually adjustable bladders ergonomically arranged to support a right thigh of the vehicle occupant. However, many other seat bladder layouts are possible.

For example, a second seat bladder layout 320 has twenty five individually pressurizeable air pockets/chambers. The seat bladder layout 320 includes a first set of at least six individually adjustable bladders ergonomically arranged to support a left buttock of the vehicle occupant, a second set of at least six individually adjustable bladders ergonomically arranged to support a right buttock of the vehicle occupant, a third set of at least two individually adjustable bladders ergonomically arranged to support a left thigh of the vehicle occupant, and a fourth set of at least two individually adjustable bladders ergonomically arranged to support a right thigh of the vehicle occupant.

A third seat bladder layout 330 has fifteen individually pressurizeable air pockets/chambers. The seat bladder layout 330 includes a first set of at least four individually adjustable bladders ergonomically arranged to support a left buttock of the vehicle occupant, a second set of at least four individually adjustable bladders ergonomically arranged to support a right buttock of the vehicle occupant, a third set of at least one individually adjustable bladders ergonomically arranged to support a left thigh of the vehicle occupant, and a fourth set of at least one individually adjustable bladders ergonomically arranged to support a right thigh of the vehicle occupant. As will be appreciated, many different bladder layouts are possible, both for the bottom & thighs portion of the vehicle seat (as shown) and for the bottom sides portion, the back & lumbar portion, the side body portion, and the head rest portion of the vehicle seat. Thus, the seat design architecture is readily scalable to different vehicle seat sizes and different vehicle seat shapes. Moreover, all of such bladder layouts can have the individual bladders grouped into zones (as discussed above) based on the nature of the body parts of the vehicle occupant that will be supported.

Figure 4A:
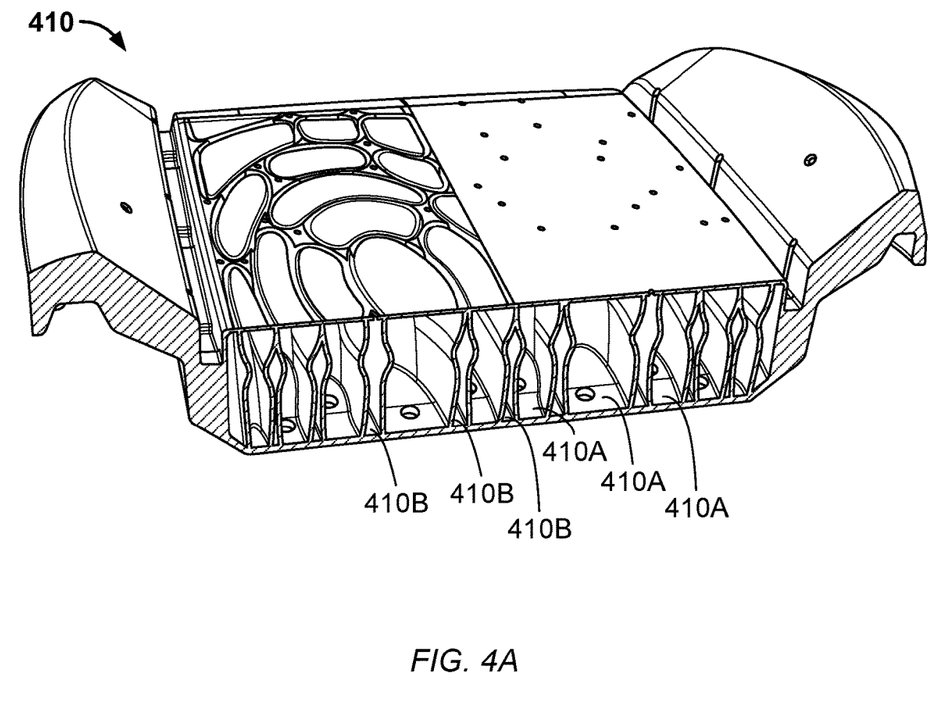
FIGS. 4A and 4B show cross-sections of examples of individually adjustable bladders and associated free air pockets in the seat cushion portion of a vehicle seat.
Figure 4B:
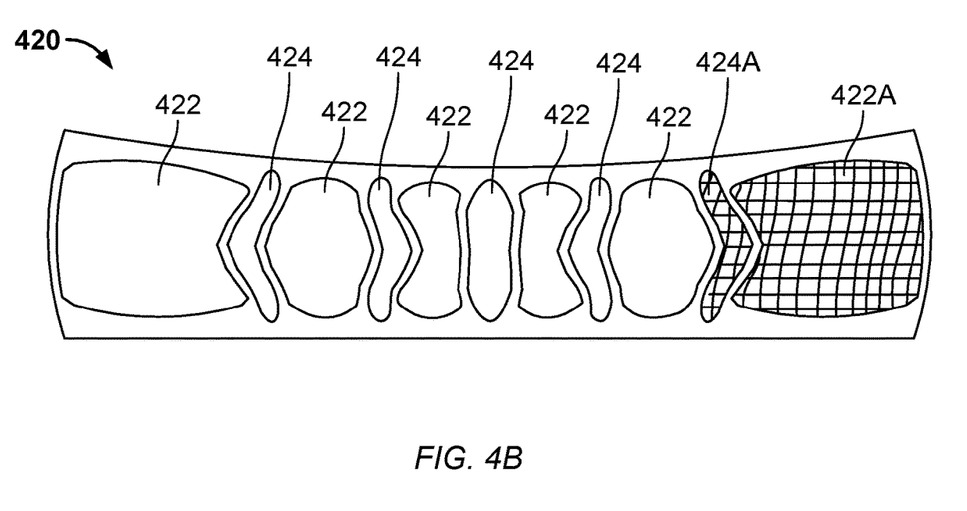

FIG. 4A shows a perspective, cross-sectional view of a bottom portion of a seat, e.g., seat 110A. As shown, the seat cushion portion of the seat can be a single cushion piece 410 with the multiple individually adjustable bladders integrally formed within the single cushion piece 410. The single cushion piece 410 can include both free air chambers 410A and the active air chambers 410B of the bladders, and the free air chambers 410A can be integrally formed by walls of the bladders. FIG. 4B shows a cross-section of another single cushion piece 420, which includes individually adjustable bladders 422 integrally formed within the single cushion piece 420, and also free air chambers 424. As shown, the free air chambers 424 are formed by the walls of the individually adjustable bladders 422. Moreover, the bladders 422, the free air chambers 424, or both, can include a lattice structure integrally formed within the single cushion piece 420 using an additive manufacturing technique, such as shown for bladder 422A and free air chamber 424A. The addition of the internal lattice structure will add to the stability of the seat cushion without substantially decreasing the ability to control the internal pressure.

The additive manufacturing technique can be used to build each cushion assembly (e.g., the single cushion piece 420) in one shot, e.g., using three dimensional (3D) printing. Each of the bladders will nonetheless maintain its individual adjustment capability through the shown design, where, despite the bladders being integrally formed and all connected with each other, the flexibility of the bladder material in the final structure allows uncoupled and independent motion of each bladder. Various materials can be used to 3D print such cushion assemblies, such as TPU (Thermoplastic Polyurethane). Other materials can be used in various implementations, provided they meet the appropriate strain and reliability requirements for the particular seat being designed and the pressure levels to be obtained, and are also flexible enough to allow for the independent movement of each bladder. Moreover, this independent movement of each bladder can still be achieved when the bladders include an internal lattice structure, when the free air chambers include an internal lattice structure, or when both the bladders and the free air chambers include an internal lattice structure.

Figure 4C:
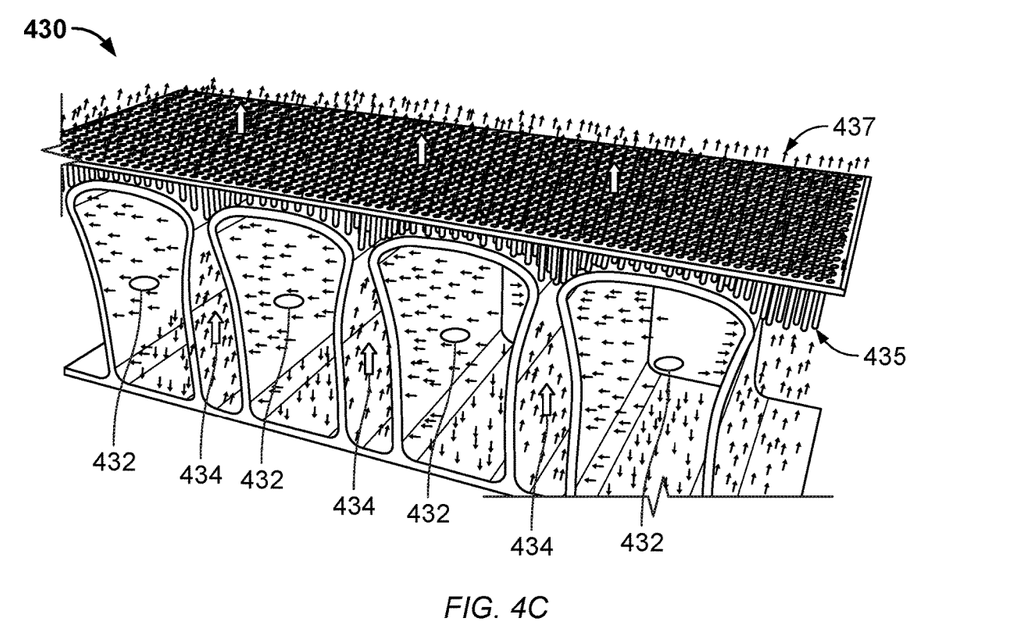
FIGS. 4C and 4D show cross-sections of another example of individually adjustable bladders and associated free air pockets in the seat cushion portion of a vehicle seat.

FIG. 4C shows a perspective, cross-sectional view of a portion 430 of another example of a bottom portion of a seat, e.g., seat 110A. In this example, the free air chambers are connected with a gas (e.g., air) input, such as from the supply reservoir 130, and a controlled flow of air (e.g., controlled by computer 120) is pushed through the free air chambers to make them serve as ventilation flow chambers 434. Thus, the cushion portion 430 of the seat includes individually adjustable bladders forming regions 432 of cushioning control, as well as regions 434 of ventilation flow. Thus, the cushioning system can provide two air flows: a first air flow used to control pressure in one or more bladder(s) to affect cushioning of the seat, and a second air flow passed between the bladders to provide ventilation. The second air flow can be provided from the same source as the first air flow, e.g., a shared supply reservoir 130, or the second air flow can be provide from a different source, e.g., from the ventilation system of the vehicle. In either case, a surface 437 of the seat portion can include holes to allow the second air flow to escape through the surface (e.g., the top surface of the seat) and provide a "no sweat" surface.

Figure 4D:
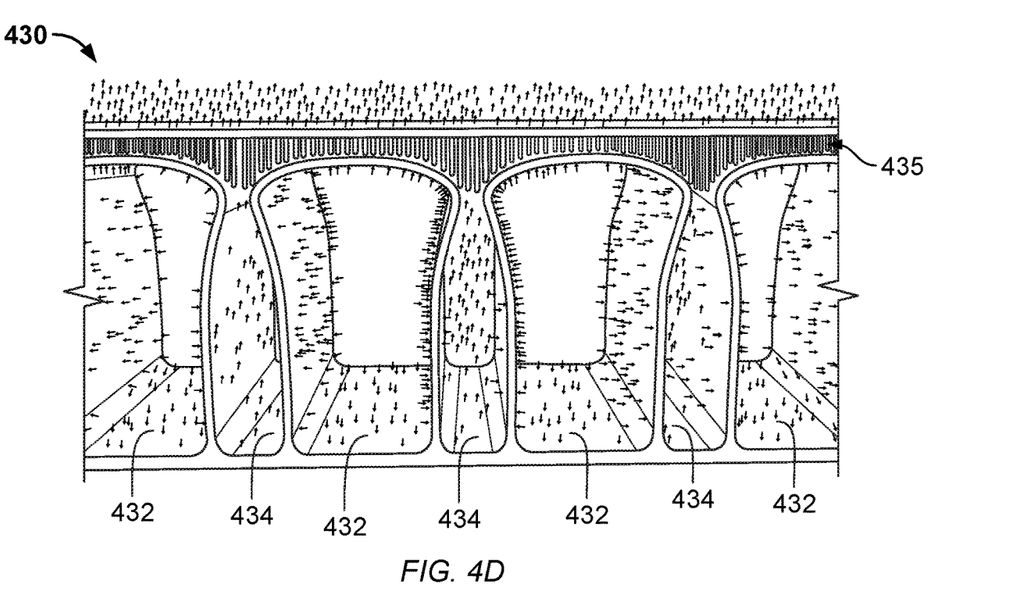

In addition, a gap can be added between the tops of the individually adjustable bladders and the surface 437. This can facilitate the use of ventilation across the surface 437 (e.g., holes distributed evenly across the surface) as this gap will allow the air flow passing between the bladders to also pass over the tops of the bladders before exiting the seat portion. In some implementations, this gap includes an additional cushioning layer for extra support. For example, additional structures 435 (e.g., lattice structures) can be included in the gap, where these additional structures 435 are made from a compressible material (e.g., TPU) that provides the cushioning layer and are arranged to create turbulent air flow within the gap to facilitate distribution of the free flow air to ventilation holes in the surface 437. FIG. 4D shows a front, cross-sectional view of the cushion portion 430.

As with the examples of FIGS. 4A and 4B, the cushion portion 430 can be part of a single cushion piece in which the multiple individually adjustable bladders are integrally formed within the single cushion piece. The bladders, the free air flow chambers, or both, can include a lattice structure integrally formed within the single cushion piece using an additive manufacturing technique to add further to the stability of the seat cushion without substantially decreasing the ability to control the internal pressure. Other manufacturing methods are also possible. Moreover, the examples of FIGS. 4A-4D can be used with various different bladder layouts, such as described above.

Figure 5:
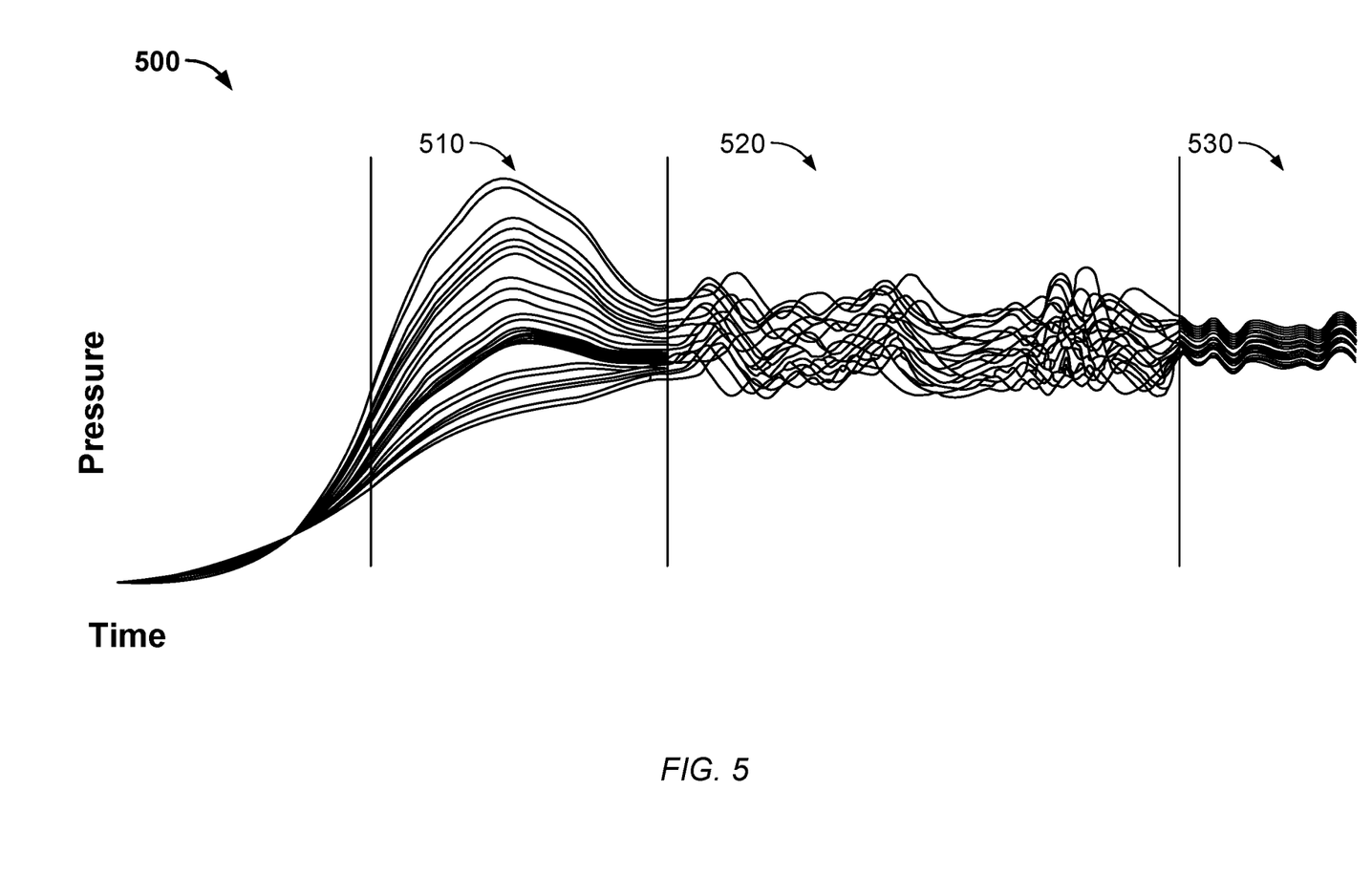
FIG. 5 shows an example of pressure values over time for a reconfigurable cushion system in which a computer is programmed to actively adjust pressure levels within individually adjustable bladders in accordance with vehicle operation data.

FIG. 5 shows an example of pressure values 500 over time for a reconfigurable cushion system in which a computer is programmed to actively adjust pressure levels within individually adjustable bladders in accordance with vehicle operation data. In this example, the pressure data is shown in three time sections: a first time section 510 corresponding to a first time use, a second time section 520 corresponding to drive time, and a third time section 530 corresponding to a second adjustment. The first time section 510 shows the pressure values over time as all individual valves are opened, the seat cushion inflates (or deflates) until the high stress area(s) equalize via the master chamber, and then all valves are individually closed. The second time section 520 shows the pressure data received from the individual valves with integrated pressure sensors as a user drives. The collection of individual sensors data provides drive style information that can then be used to correct pressure levels per chamber in the seat cushion during the third time section 530.

Computer control of the pressure levels within the individually adjustable bladders in accordance with vehicle operation data can include active adjustment of the pressure levels based on a driving style of the current driver (e.g., as determined from historical vehicle operation data). Computer control of the pressure levels within the individually adjustable bladders in accordance with vehicle operation data can include active adjustment of the pressure levels based on a sharpness of road contours (e.g., as determined from current, real-time vehicle operation data). Computer control of the pressure levels within the individually adjustable bladders in accordance with vehicle operation data can include active adjustment of the pressure levels based on bumps in a road being travelled (e.g., as determined from current, real-time vehicle operation data). Computer control of the pressure levels within the individually adjustable bladders in accordance with vehicle operation data can include active adjustment of the pressure levels based on information about an accident that is occurring (e.g., as determined from current, real-time vehicle operation data).

Figure 6:
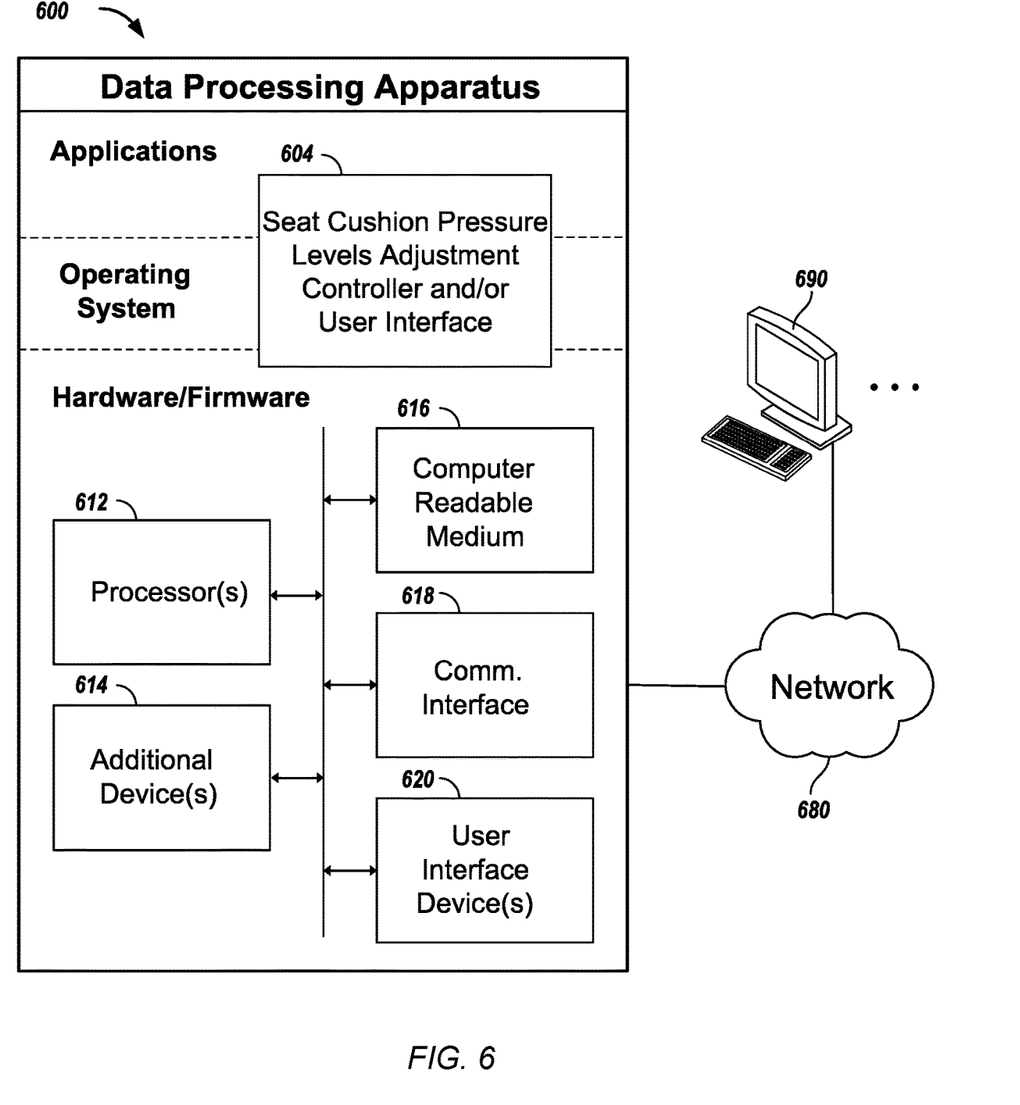
FIG. 6 is a schematic diagram of a data processing system usable to implement the described systems and techniques.

FIG. 6 is a schematic diagram of a data processing system including a data processing apparatus 600, which is usable to implement the described systems and techniques, e.g., the data processing apparatus 600 can be the computer 120 in FIG. 1. The data processing apparatus 600 can be connected with one or more computers 690 through a network 680 (e.g., server computers 690 through a wireless computer network 680). While only one computer is shown in FIG. 6 as the data processing apparatus 600, multiple computers can be used. The data processing apparatus 600 includes various computer program modules, which can be distributed between an applications layer and an operating system or isolated into one or the other, depending on implementation.

For example, a seat cushion pressure levels adjustment controller 604 can be embedded code in the vehicle's computer control system, where the seat cushion pressure levels adjustment program 604 provides adaptive, ride-active and intelligent adjustment of pressure levels (e.g., in real-time as the vehicle is being driven). As another example, a seat cushion pressure levels adjustment user interface 604 can be software that runs in the vehicle's user settings control system, where the seat cushion pressure levels adjustment program 604 provides the vehicle user with operational control over the adjustments (e.g., selecting between different control settings options, such as a firm seat versus a soft seat). The number of computer program modules used (and how much functionality is built into circuitry directly) can vary from one implementation to another.

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor. Each processor 612 is capable of processing instructions stored on the computer readable medium 616 or on a storage device such as one of the additional devices 614. The data processing apparatus 600 uses its communication interface 618 to communicate with one or more computers 690, for example, over a network 680. Examples of user interface devices 620 include a display, a camera, a speaker, a microphone, a tactile feedback device, and a touch screen display. The data processing apparatus 600 can store instructions that implement operations associated with the program(s) described above, for example, on the computer readable medium 616 or one or more additional devices 614, for example, one or more of a hard disk device, an optical disk device, a tape device, and a solid state memory device.

The program 604 can be designed to provide a fully customizable seat, where the pressure levels in the bladders are adjusted to suit the user's profile. The program 604 can be designed to provide a ride-active control system, where the pressure levels in the bladders are adjusted according to vehicle maneuvers and to help reduce the risk of injury during accidents. In addition, artificial intelligence and machine learning techniques can be used in the design of the program 604. For example, an Artificial Neural Network for Unsupervised Learning using an Autoencoder can be used to determine the operational parameters and responses of the program 604.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system (e.g., a vehicle control system). The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them, but the computer-readable medium is not a transitory signal or carrier wave.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a touch sensitive display device (e.g., associated with a vehicle control system) can be used to enable the user to provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiment described above can be combined with any of the other features of the embodiment described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A vehicle seat system comprising:
   a vehicle seat defining a vehicle occupant accommodating space, the vehicle seat including a seat cushion portion comprising multiple individually adjustable bladders, wherein each of the multiple individually adjustable bladders has
      a connected valve that controls fluid communication with an internal space of the individually adjustable bladder to adjust a pressure level within the internal space of the individually adjustable bladder, and
      an associated sensor configured to detect the pressure level within the internal space of the individually adjustable bladder, wherein each associated sensor is integrated with each respective connected valve;
   a shared air supply reservoir configured and arranged to be filled with pressurized air for provision to the individually adjustable bladders through the valves;
   an air compressor coupled with the shared air supply reservoir, the air compressor being configured and arranged to fill the shared air supply reservoir with the pressurized air for provision to the individually adjustable bladders;
   a manifold coupling the individually adjustable bladders with the shared air supply reservoir; and
   a computer programmed to individually adjust pressure levels within the multiple individually adjustable bladders using the valves and based on data received from the sensors.

2. The vehicle seat system of claim 1, wherein the shared air supply reservoir is included within the vehicle seat.

3. The vehicle seat system of claim 2, wherein each connected valve comprises an electronic solenoid and is integrated into the manifold coupling the bladder with the central supply reservoir.

4. The vehicle seat system of claim 1, comprising:
   a heat exchanger coupled with the shared air supply reservoir to heat and cool the pressurized air in the shared air supply reservoir.

5. The vehicle seat system of claim 4, wherein the computer is programmed to individually adjust the pressure levels within the multiple individually adjustable bladders in zones of the seat cushion portion to ensure an even distribution of pressure based on user preference and pressure normalization, and wherein the computer is programmed to control the heat exchanger to adjust a temperature of the pressurized air in the shared air central supply reservoir based on user preference.

6. The vehicle seat system of claim 1, wherein the seat cushion portion comprises a single cushion piece with the multiple individually adjustable bladders integrally formed within the single cushion piece.

7. The vehicle seat system of claim 6, wherein the single cushion piece includes free air chambers formed at least in part by walls of the individually adjustable bladders.

8. The vehicle seat system of claim 7, wherein each of the multiple individually adjustable bladders, the free air chambers, or both, includes a lattice structure integrally formed within the single cushion piece using an additive manufacturing technique.

9. The vehicle seat system of claim 7, wherein the single cushion piece includes:
   a surface portion defining holes through which air exits the single cushion piece; and
   cushioning structures formed between the surface portion and top portions of the multiple individually adjustable bladders, wherein the cushioning structures are configured and arranged to allow air to reach the holes defined in the surface portion.

10. The vehicle seat system of claim 9, wherein the computer is programmed to individually adjust the pressure levels within the multiple individually adjustable bladders, and wherein the computer is programmed to control ventilation air flow through the free air chambers, the cushioning structures and the holes defined in the surface portion.

11. The vehicle seat system of claim 1, wherein the computer is programmed to actively adjust the pressure levels within the multiple individually adjustable bladders in accordance with vehicle operation data.

12. The vehicle seat system of claim 11, wherein the computer is programmed to actively adjust the pressure levels within the multiple individually adjustable bladders in accordance with the vehicle operation data indicating a vehicle driving style.

13. The vehicle seat system of claim 11, wherein the computer is programmed to actively adjust the pressure levels within the multiple individually adjustable bladders in accordance with the vehicle operation data indicating a sharpness of road contours.

14. The vehicle seat system of claim 11, wherein the computer is programmed to actively adjust the pressure levels within the multiple individually adjustable bladders in accordance with the vehicle operation data indicating bumps in a road being travelled.

15. The vehicle seat system of claim 11, wherein the computer is programmed to actively adjust the pressure levels within the multiple individually adjustable bladders in accordance with the vehicle operation data indicating an accident is occurring.

16. The vehicle seat system of claim 1, wherein the multiple individually adjustable bladders of the seat cushion portion comprise:
   a first set of at least eight individually adjustable bladders ergonomically arranged to support a left buttock of the vehicle occupant;
   a second set of at least eight individually adjustable bladders ergonomically arranged to support a right buttock of the vehicle occupant;
   a third set of at least six individually adjustable bladders ergonomically arranged to support a left thigh of the vehicle occupant; and
   a fourth set of at least six individually adjustable bladders ergonomically arranged to support a right thigh of the vehicle occupant.

17. The vehicle seat system of claim 1, wherein the vehicle seat includes two side seat portions, back and lumbar portions, two side body portions and a head rest portion, and each of one or more of the two side seat portions, the back and lumbar portions, the two side body portions and the head rest portion comprises multiple individually adjustable bladders.

18. The vehicle seat system of claim 1, wherein the multiple individually adjustable bladders of the seat cushion portion are forty bladders in total.

* * * * *

UNITED STATES PATENT AND TRADEMARK OFFICE
CERTIFICATE OF CORRECTION

PATENT NO. : 11,135,946 B2  
APPLICATION NO. : 16/414052  
DATED : October 5, 2021  
INVENTOR(S) : Bhupendra Lodhia and Andriy Banadyha Page 1 of 1

It is certified that error appears in the above-identified patent and that said Letters Patent is hereby corrected as shown below:

In the Claims

Column 10, Line 62, in Claim 5: after "shared air" delete "central".

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*